(12) United States Patent
Park et al.

(10) Patent No.: US 11,499,077 B2
(45) Date of Patent: Nov. 15, 2022

(54) DOUBLE-SIDED TAPE AND DISPLAY DEVICE INCLUDING THE SAME

(71) Applicants: Samsung Display Co. Ltd., Yongin-si (KR); Sekisui Chemical Co., Ltd., Osaka (JP)

(72) Inventors: Se Ki Park, Hwaseong-si (KR); Dong Yeol Yeom, Suwon-si (KR); Mariko Noda, Shiga (JP); Satoshi Doi, Shiga (JP); Shigeki Matsuki, Shiga (JP); Yuki Iwai, Shiga (JP); Tomoya Kawamoto, Shiga (JP)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 16/233,169

(22) Filed: Dec. 27, 2018

(65) Prior Publication Data

US 2019/0194511 A1    Jun. 27, 2019

(30) Foreign Application Priority Data

Dec. 27, 2017    (KR) .......................... 10-2017-0180387

(51) Int. Cl.
*C09J 201/02*    (2006.01)
*C09J 7/38*    (2018.01)
(Continued)

(52) U.S. Cl.
CPC ............. *C09J 201/02* (2013.01); *C09J 7/243* (2018.01); *C09J 7/29* (2018.01); *C09J 7/385* (2018.01);
(Continued)

(58) Field of Classification Search
CPC ............. C09J 201/02; C09J 7/243; C09J 7/29
See application file for complete search history.

(56) References Cited

U.S. PATENT DOCUMENTS

2010/0163166 A1*    7/2010    Jeong .................... C09J 133/08
156/230
2013/0017389 A1    1/2013    Tamura et al.
(Continued)

FOREIGN PATENT DOCUMENTS

CN          101619198 A    1/2010
KR       20130009684 A    1/2013
(Continued)

OTHER PUBLICATIONS

Translation of KR 20150060085. See IDS filed Dec. 27, 2018 for date and inventor.*

(Continued)

*Primary Examiner* — Chinessa T. Golden
(74) *Attorney, Agent, or Firm* — Cantor Colburn LLP

(57) ABSTRACT

A double-sided tape including: a first adhesive layer including about 100 parts by weight of an acrylic polymer, about 1 to about 2 parts by weight of a silane coupling agent, and about 0.1 to about 0.18 parts by weight of carbon black; a foamed polymer layer disposed on the first adhesive layer, including a urethane foam; an interlayer polymer layer disposed on the foamed polymer layer, including a polyolefin (PO), polyethylene terephthalate (PET), a polyester, or a combination thereof; and a second adhesive layer disposed on the interlayer polymer layer, including about 100 parts by weight of an acrylic polymer, about 1 to about 2 parts by weight of a silane coupling agent, and about 0.1 to about 0.18 parts by weight of carbon black, wherein an overall thickness of the double-sided tape is in a range of about 0.4 millimeters to about 1.3 millimeters.

14 Claims, 4 Drawing Sheets

(51) Int. Cl.
*C09J 133/08* (2006.01)
*C09J 7/24* (2018.01)
*C09J 7/29* (2018.01)
*C09J 133/14* (2006.01)
*C08K 3/04* (2006.01)
*C08K 5/54* (2006.01)

(52) U.S. Cl.
CPC ........... *C09J 133/08* (2013.01); *C09J 133/14* (2013.01); *C08K 3/04* (2013.01); *C08K 5/54* (2013.01); *C09J 2203/00* (2013.01); *C09J 2203/318* (2013.01); *C09J 2301/124* (2020.08); *C09J 2301/162* (2020.08); *C09J 2301/408* (2020.08); *C09J 2400/243* (2013.01); *C09J 2423/006* (2013.01); *C09J 2433/00* (2013.01); *C09J 2467/006* (2013.01); *C09J 2475/006* (2013.01)

(56) References Cited

U.S. PATENT DOCUMENTS

| | | | |
|---|---|---|---|
| 2014/0044915 A1* | 2/2014 | Niwa | C09J 133/08 428/80 |
| 2016/0264827 A1* | 9/2016 | Lee | G06F 1/1601 |

FOREIGN PATENT DOCUMENTS

| | | |
|---|---|---|
| KR | 1020140133630 A | 11/2014 |
| KR | 1020150060085 A | 6/2015 |
| KR | 101634817 B1 | 6/2016 |
| KR | 101644860 B1 | 7/2016 |
| KR | 101645374 B1 | 7/2016 |
| KR | 101653027 B1 | 8/2016 |
| KR | 20170111651 A | 10/2017 |
| WO | WO-2018034230 A1 * | 2/2018 ............. C09J 11/06 |

OTHER PUBLICATIONS

Derwent Abstract of WO 2018034230. See Above for date and inventor.*
English Abstract of CN 101619198.
Office Action issued in CN 201811598799.3, dated Oct. 27, 2021.
English Abstract of KR 1020130009684.
English Abstract of KR 10-2017-0111651.
Office Action dated May 18, 2022, issued in corresponding application No. KR 10-2017-0180387, 5 pp.

* cited by examiner

US 11,499,077 B2

DOUBLE-SIDED TAPE AND DISPLAY DEVICE INCLUDING THE SAME

This application claims priority to and the benefit of Korean Patent Application No. 10-2017-0180387, filed on Dec. 27, 2017, in the Korean Intellectual Property Office, and all the benefits accruing therefrom under 35 U.S.C. 119, the content of which in its entirety is herein incorporated by reference.

BACKGROUND

1. Field of the Disclosure

The present disclosure relates to a double-sided tape and a display device including the same.

2. Description of the Related Art

In the field of display devices such as monitors, televisions ("TVs"), and mobile devices, a double-sided tape may be employed to adhere a display panel and a mold frame supporting the display panel.

A double-sided tape for application to a curved display device having a curved surface may improve visibility thereof.

Since a display panel and a mold frame may desirably be attached and fixed to each other while maintaining a predetermined curvature, the curved display device may have greater shear and tensile stresses transmitted to the double-sided tape, and a silicone resin may be additionally applied to a void space between the display panel and the mold frame to withstand the stresses, e.g., the double-sided tape is not torn.

However, an exterior of the silicone resin may deteriorate due to overflow when the amount of the silicone resin to be applied is excessively large, and a fixing force of the display panel may be weakened when the amount of the silicone resin is too small.

SUMMARY

Embodiments provide a double-sided tape capable of effectively fixing a display panel to a mold frame in a display device even when a silicone resin is omitted because of improved properties of the double-sided tape such as adhesiveness, attachment, and durability.

Embodiments provide a display device in which a display panel is stably fixed to a mold frame.

Embodiments are not limited to the above-mentioned objects, and other objects which are not mentioned may be clearly understood by those skilled in the art from the following description.

A double-sided tape disposed between a curved display panel having a curvature in at least one direction and a curved mold frame having a shape corresponding to the display panel and configured to fix the display panel and the mold frame to each other, the double-sided tape includes a first adhesive layer including about 100 parts by weight of an acrylic polymer, about 1 to about 2 parts by weight of a silane coupling agent, and about 0.1 to about 0.18 parts by weight of carbon black, the first adhesive layer having a degree of crosslinking of about 40% to about 49% by weight and an optical density (OD) of about 5 or greater; a foamed polymer layer disposed on the first adhesive layer, the foamed polymer layer including a urethane foam, the foamed polymer layer having an OD of about 5 or greater and a thickness of about 0.3 millimeters (mm) to about 1.15 mm; an interlayer polymer layer disposed on the foamed polymer layer, the interlayer polymer layer including a polyolefin (PO), polyethylene terephthalate (PET), a polyester, or a combination thereof, the interlayer polymer layer having an OD of about 5 or greater and a thickness of about 0.045 mm to about 0.055 mm; and a second adhesive layer disposed on the interlayer polymer layer, the second adhesive layer including about 100 parts by weight of an acrylic polymer, about 1 to about 2 parts by weight of a silane coupling agent, and about 0.1 to about 0.18 parts by weight of carbon black, the second adhesive layer having a degree of crosslinking of about 40% to about 49% by weight and an OD of about 5 or greater, wherein an overall thickness of the double-sided tape is in a range of about 0.4 mm to about 1.3 mm.

In an exemplary embodiment, the silane coupling agent may include a compound represented by Formula 1:

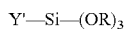

Formula 1 wherein, in Formula 1, Y' represents an amino group, an epoxy alkyl group, a mercapto group, or an allyl group, and each OR independently represents an alkoxy group or an acetyloxy group.

In an exemplary embodiment, the first adhesive layer, the second adhesive layer, or a combination thereof may further include an isocyanate curing agent.

In an exemplary embodiment, the isocyanate curing agent may include toluene-2,4-diisocyanate or a derivative thereof.

In an exemplary embodiment, the first adhesive layer, the second adhesive layer, or the combination thereof may include about 6 to about 7 parts by weight of the isocyanate curing agent, based on the 100 parts by weight of the acrylic polymer.

In an exemplary embodiment, the foamed polymer layer may have a density of about 0.36 grams per cubic centimeters ($g/cm^3$) to about 0.6 $g/cm^3$.

In an exemplary embodiment, the curvature may be in a range of about 600 R to about 4,000 R.

In an exemplary embodiment, the double-sided tape may have a vertical ultimate tensile strength of 15.47 kilogram-force per square inch ($kgf/inch^2$) or greater, when measured 24 hours after the double-sided tape is attached to a mold frame and a display panel.

In an exemplary embodiment, the double-sided tape may have a horizontal ultimate tensile strength of 12.8 $kgf/inch^2$ or greater, when measured 30 minutes after the double-sided tape is attached to a mold frame and a display panel.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION OF THE EMBODIMENTS

Figure 1:
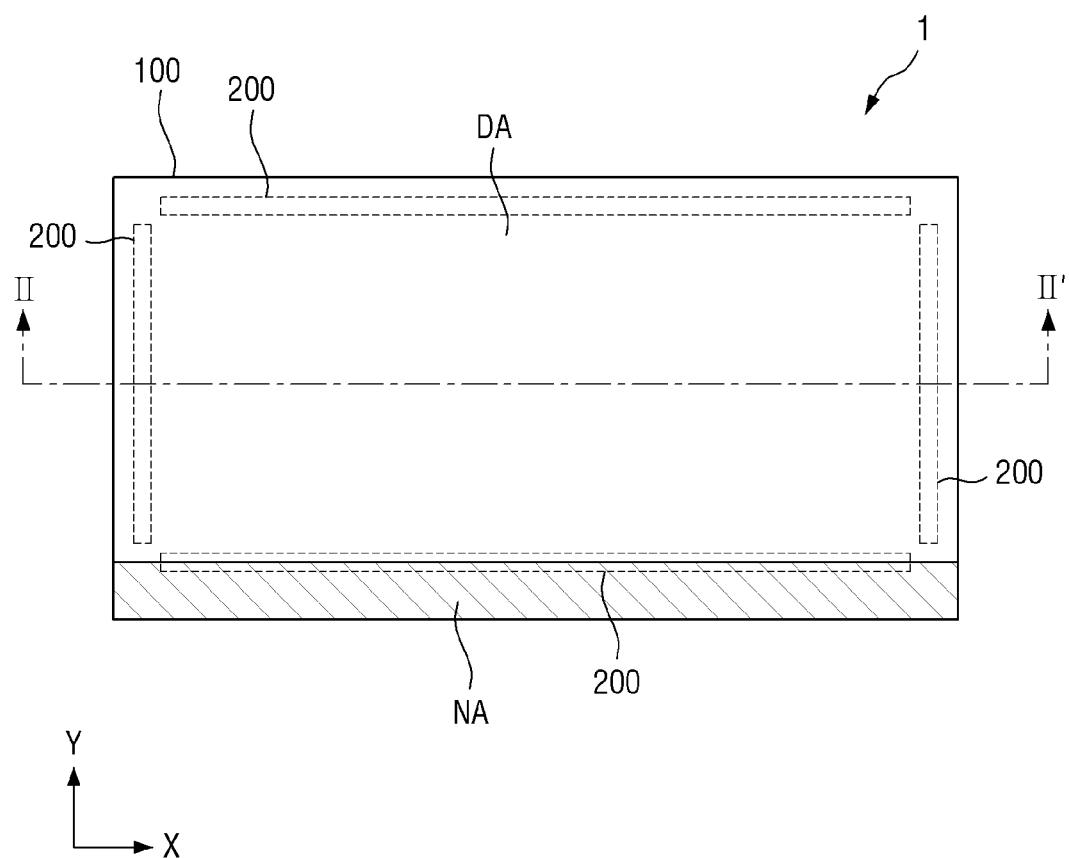
FIG. 1 is a plan view of an embodiment showing a display device.

Features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, including "at least one," unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof "At least one" is not to be construed as limiting "a" or "an." "Or" means "and/or." As used herein, the term "and/or" includes any and all combinations of one or more of the associated listed items.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, "acetyloxy" means a group with the structural formula $CH_3COO-$.

As used herein, "alkyl" means a straight or branched chain, saturated, monovalent hydrocarbon group (e.g., methyl or hexyl).

As used herein, "acrylic polymer" includes homopolymers and copolymers of acrylic acid and ($C_{10-30}$ alkyl) acrylate or ($C_{10-30}$ alkyl) methacrylate units that can be optionally cross-linked.

As used herein, "alkoxy" means an alkyl group that is linked via an oxygen (i.e., alkyl-O—), for example, methoxy, ethoxy, and sec-butyloxy groups.

As used herein, "allyl" means a group with the structural formula $H_2C=CH-CH_2-$.

As used herein, "arene" means a hydrocarbon having an aromatic ring, and includes monocyclic and polycyclic hydrocarbons wherein the additional ring(s) of the polycyclic hydrocarbon may be aromatic or nonaromatic. Specific arenes include benzene, naphthalene, toluene, and xylene.

As used herein, "aryl" means a monovalent group formed by the removal of one hydrogen atom from one or more rings of an arene (e.g., phenyl or naphthyl).

As used herein, "amino" means a group of the formula $-N(R^1)_2$, wherein each $R^1$ is independently hydrogen, a $C_{1-6}$ alkyl, or a $C_{6-12}$ aryl.

As used herein, "epoxy alkyl" means a group in which an epoxy group is introduced into an alkyl group.

As used herein, "mercapto" means a group containing a sulfur atom bonded to a hydrogen atom.

Hereinafter, embodiments will be described with reference to the accompanying drawings.

FIG. 1 is a plan view showing a display device according to an embodiment.

Referring to FIG. 1, a display device 1 includes a display panel 100. The display panel 100 is a panel for displaying a screen and includes a display area ("DA") and a non-display area ("NA") when seen in the plan view. The display area DA is an area in which images are seen, and the non-display area NA is an area in which images are not seen. The non-display area NA may be formed outside, e.g., of a periphery of, the display area DA.

The display panel 100 may have a generally rectangular shape when seen in the plan view. For example, the display device 1 may have a rectangular shape with a pair of long sides in one direction X and a pair of short sides in another direction Y perpendicular to the one direction X, as shown in FIG. 1.

The display device 1 may be a narrow bezel display device having a narrow bezel, or may be a frameless display device in which a top cover or a top chassis covering a portion of a top of the display panel 100 is omitted. Accordingly, the non-display area NA may be disposed only in a minimal area when seen in the plan view, and may be disposed, for example, not along one long side and the pair of short sides but only along the other long side.

Double-sided tapes 200 are disposed near edges of the display device 1. The double-sided tapes 200 may be disposed along one or more edges of the display device 1. The double-sided tape 200 may be disposed between the display panel 100 and a mold frame 300 in the display device 1.

Figure 2:
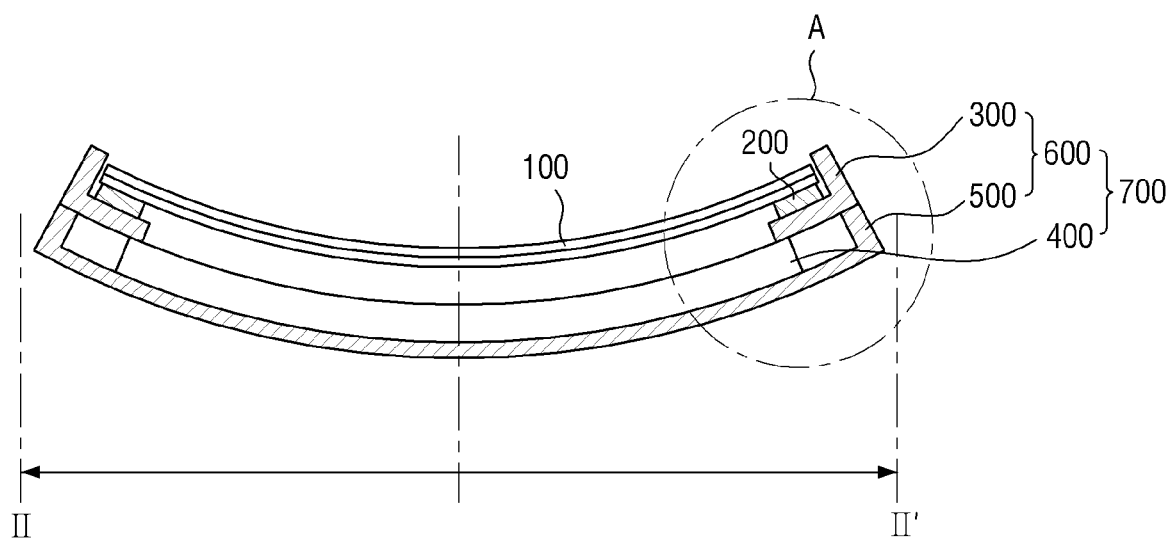
FIG. 2 is a cross-sectional view taken along line II-II' of FIG. 1.
Figure 3:
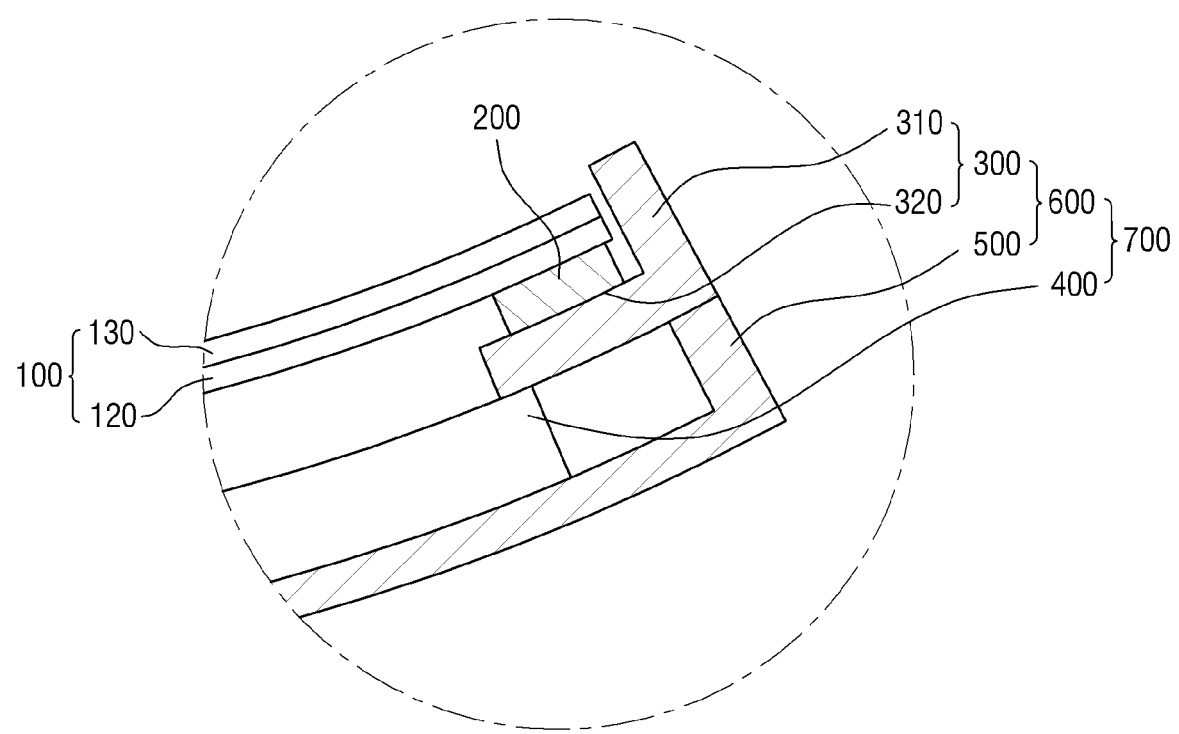
FIG. 3 is an enlarged cross-sectional view of portion A of FIG. 2.

FIG. 2 is a cross-sectional view taken along line II-II' of FIG. 1, and FIG. 3 is an enlarged cross-sectional view of portion A of FIG. 2.

Referring to FIG. 2, the display device 1 may be a curved display device having a predetermined curvature to implement, e.g., for use in, a monitor, a TV, a mobile device, and the like having a curved surface. Specifically, the display device 1 may be a curved display device having a curvature only in the one direction X when seen in the plan view and having a curved shape only in a cross-section cut, e.g., view, in the one direction X.

The display device 1 may have a constant curvature throughout all sections thereof or may have multiple different curvatures for each predetermined section. The display device 1 may have a concavely curved shape when a screen displayed by the display panel 100 is viewed from the outside.

The display device 1 includes the display panel 100 and a storage container 600 supporting the display panel 100. When the display panel 100 is a light receiving element such as a liquid crystal display panel, the display device 1 may further include a backlight unit 700. The backlight unit 700 may include, e.g., fill, a part of or the entire storage container 600. When the display panel 100 is a self-luminous element such as an organic light emitting display, the backlight unit 700 may be omitted and a separate storage container 600 may be provided. Hereinafter, a case in which a liquid crystal display panel is applied, e.g., used, as the display panel 100 is exemplified in the present specification, but embodiments are not limited thereto.

The backlight unit 700 includes an optical member 400 and the storage container 600. The storage container 600 may include a bottom chassis 500 and the mold frame 300.

Elements, such as the bottom chassis 500, the display panel 100, and the mold frame 300, may also have a curved shape corresponding to the shape of the curved display device.

The bottom chassis 500 may be disposed below the display device 1. The bottom chassis 500 may have a plate shape having a bottom and side walls to accommodate parts constituting the display device 1. The bottom chassis 500 receives the optical member 400.

The bottom chassis 500 may be formed of a metal material, a synthetic resin material, or the like having a predetermined rigidity.

The optical member 400 may be disposed on the bottom chassis 500. The optical member 400 may be accommodated in a plate structure formed by the bottom and sidewalls of the bottom chassis 500.

Although not shown in the drawings, the optical member 400 may include a light source, a light guide plate, an optical sheet, a diffusion plate, and the like to provide light to the display panel 100 disposed above the optical member 400. An example of the light source may include a light emitting diode ("LED"), and examples of the optical sheet may include a prism sheet, a diffusion sheet, a microlens, or a reflective polarizer, but embodiments are not limited thereto.

In the exemplary embodiment, the optical member 400 may be an edge-type optical member 400 in which a plurality of light sources are disposed to face a side surface of the light guide plate and an optical sheet is disposed between the light guide plate and the display panel 100, but embodiments are not limited thereto.

The mold frame 300 may be disposed on the bottom chassis 500 and the optical member 400. The mold frame 300 may be supported by the bottom chassis 500 while receiving or supporting the display panel 100, and may prevent the occurrence of a clearance of the optical member 400 disposed on the bottom chassis 500.

The mold frame 300 may have a rectangular frame shape. The mold frame 300 may include a side wall 310 and a seating portion 320 supporting the display panel 100.

The mold frame 300 may be formed of a polymer material such as a polycarbonate ("PC") having a predetermined stiffness and flexibility. Accordingly, the mold frame 300 may be curved and disposed in a shape corresponding to the bottom chassis 500 having a curvature.

The display panel 100 may be disposed above the bottom chassis 500 and the optical member 400. Specifically, the display panel 100 may be disposed above the bottom chassis 500 and the optical member 400 with the edges of the display panel supported by the seating portion 320 of the mold frame 300. The edges of the display panel 100 may overlap at least a portion of the seating portion 320. The display panel 100 may be fixed to the mold frame 300 by the double-sided tape 200.

The display panel 100 may be a curved display panel having a curvature and the display device 1 may have a curved surface. That is, the display panel may be curved with a curvature in at least one direction, and the mold frame may be curved in a shape corresponding to the display panel.

The display panel 100 may include a first substrate 120 and a second substrate 130 disposed on the first substrate 120. A liquid crystal layer (not shown) may be interposed between the first substrate 120 and the second substrate 130. The display panel 100 may further include a polarizing element (not shown).

The first substrate 120 may be a substrate in which thin film transistors ("TFTs") are formed as switching devices in a matrix form. A data line and a gate line may be connected to a source terminal and a gate terminal of the each of the TFTs, respectively, and pixel electrodes made of a conductive material may be connected to drain terminals of the TFTs.

The second substrate 130 may be a substrate disposed opposite the first substrate 120, and red, green and blue ("RGB") pixels for implementing, e.g., forming, colors may be formed in a thin film form in the second substrate. A suitable electrode made of a conductive material may be formed in the second substrate 130 to face the pixel electrodes formed in the first substrate 120.

The double-sided tape 200 may be disposed between the mold frame 300 and the display panel 100. The double-sided tape 200 may be attached to the mold frame 300 and the display panel 100 via adhesive layers formed on top and bottom portions thereof, thereby fixing the mold frame and the display panel to each other. Portions of the mold frame 300 and the display panel 100 overlapping the double-sided tape 200 may be curved to have curvatures or may have planar shapes. The portions of the mold frame 300 and the display panel 100 overlapping the double-sided tape 200 are shown to have curvatures in the drawings, and the double-sided tape 200 may accordingly have a curved shape corresponding to the shapes of the mold frame 300 and the display panel 100.

A shear stress and a tensile stress may be applied between the display panel 100 and the mold frame 300 in the curved display device 1. Therefore, it is preferable for the double-sided tape 200 to be interposed between the display panel 100 and the mold frame 300 such that the shear stress and the tensile stress described above may be withstood, e.g., the double-sided tape 200 is not torn. The double-sided tape 200 having such characteristics will be described in more detail.

Figure 4:
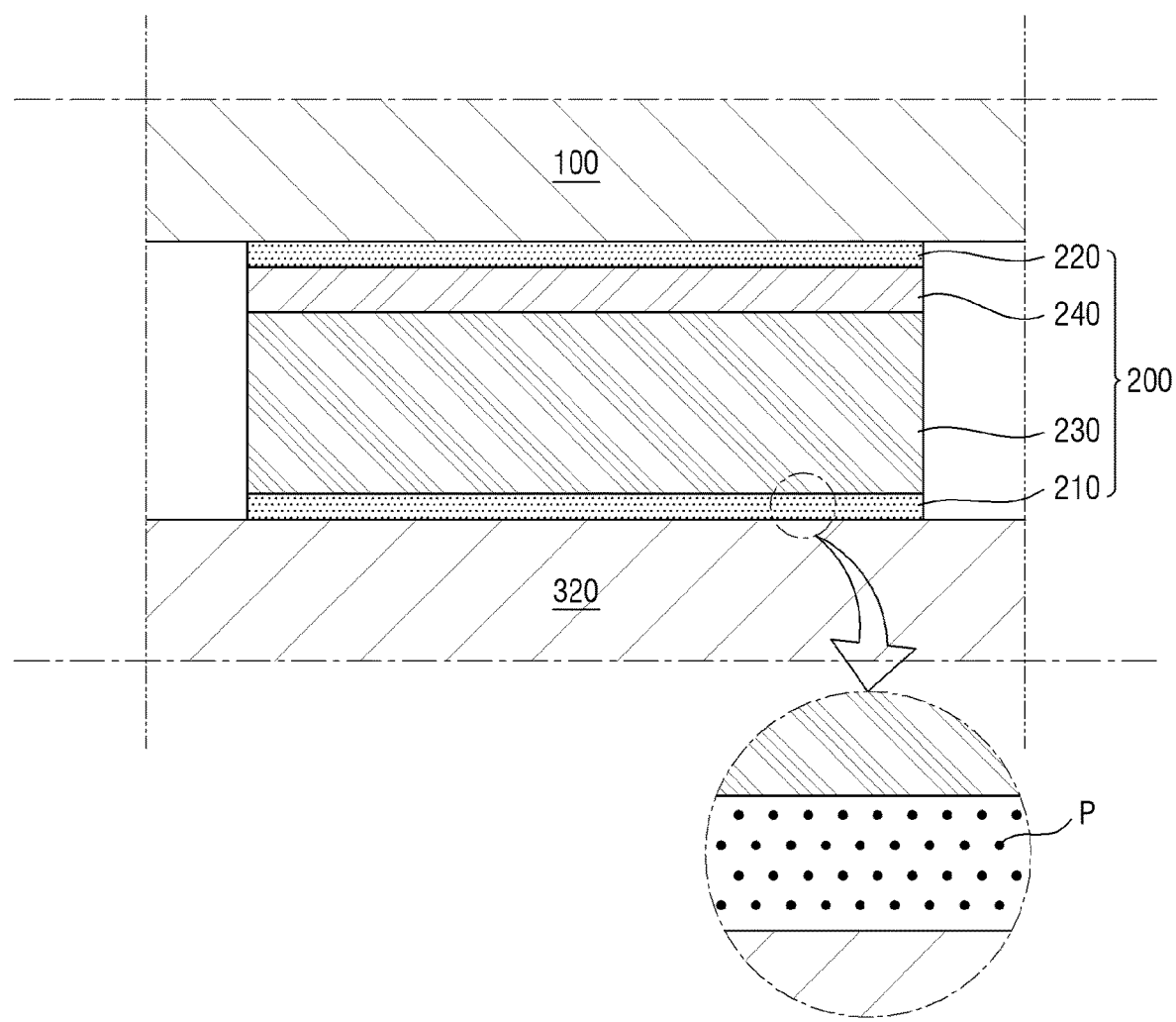
FIG. 4 is a schematic view of an embodiment showing a stacked structure of a double-sided tape.

FIG. 4 is a schematic view showing a stacked structure of a double-sided tape according to an embodiment.

Referring to FIG. 4, the double-sided tape 200 includes a first adhesive layer 210, a foamed polymer layer 230, an interlayer polymer layer 240, and a second adhesive layer 220.

The first adhesive layer 210 and the second adhesive layer 220 are disposed at a lowermost layer and an uppermost layer of the double-sided tape 200, respectively. The first and second adhesive layers 210 and 220 may be attached to an upper surface of the seating portion 320 of the mold frame 300 and a lower surface of the display panel 100, respectively.

The first adhesive layer 210 may include a pressure-sensitive adhesive ("PSA") as a main component.

The PSA may be an acryl polymer, a silicone polymer, a polyester polymer, a rubber polymer, a polyurethane polymer, or a combination thereof.

In an exemplary embodiment, the PSA may include an acrylic copolymer in which an acrylic compound is formed by copolymerization with other monomers.

Examples of the acrylic compound may include, but are not limited to, acrylic monomers having 1 to 18 carbon atoms, and specific examples thereof may include, but are not limited to, methyl(meth)acrylate, ethyl(meth)acrylate, propyl(meth)acrylate, n-butyl(meth)acrylate, isobutyl(meth)acrylate, 2-ethylhexyl(meth)acrylate, n-octyl(meth)acrylate, isooctyl(meth)acrylate, lauryl(meth)acrylate, stearyl(meth)acrylate, isononyl(meth)acrylate, cyclohexyl(meth)acrylate, benzyl(meth)acrylate, methoxyethyl(meth)acrylate, ethoxyethyl(meth)acrylate, phenoxyethyl(meth)acrylate, and the like.

Examples of other monomers copolymerizable with the acrylic compound may include, but are not limited to, styrene monomers, olefin monomers, vinyl esters, cyano group-containing monomers, amide group-containing monomers, hydroxyl group-containing monomers, acidic group-containing monomers, epoxy group-containing monomers, amino group-containing monomers, carboxyl group-containing monomers, and the like.

The first adhesive layer 210 may further include a coupling agent. The coupling agent may improve an interfacial effect by increasing adhesion between a surface of the double-sided tape 200 and a surface of the display panel 100 or the mold frame 300, which is an adherend.

The coupling agent may be a silane coupling agent capable of improving adhesion between the display panel 100 made of a glass material and the double-sided tape 200 made of a polymer material.

The silane coupling agent may include a compound represented by Formula 1 below.

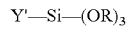   Formula 1

In Formula 1, Y' may denote an amino group, an epoxy alkyl group, a mercapto group, or an allyl group.

In an exemplary embodiment, —Y' may denote a functional group of which formula is represented by —NH$_2$, —CHOCH—, —SH, —CH=CH—CH$_3$, or —CH$_2$—CH=CH$_2$.

Each OR may independently denote an alkoxy group or an acetyloxy group. In an exemplary embodiment, —OR may denote a functional group of which formula is represented by —OCH$_3$, —OC$_2$H$_5$, or —OCOCH$_3$.

An amount of the coupling agent included in the first adhesive layer 210 may be in a range of about 1 to about 2 parts by weight, based on 100 parts by weight of the PSA. Adhesion between the double-sided tape 200 and the adherend may be significantly improved when the amount of the coupling agent is about 1 part by weight or greater, and weakening of the bonding force inside the polymers constituting the adhesive layer may be effectively prevented when the amount is about 2 parts by weight or less.

The first adhesive layer 210 may further include a curing agent. The curing agent may act to improve a bulk effect by enhancing a bonding force between polymers in the adhesive layer. In an exemplary embodiment, the curing agent may act as a cross-linking agent for the acrylic copolymer which is a PSA component.

The curing agent may be an isocyanate curing agent, and may specifically include toluene-2,4-diisocyanate represented by Formula 2 below or a derivative thereof.

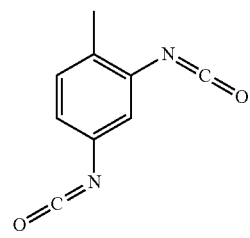

Formula 2

An amount of the curing agent included in the first adhesive layer 210 may be in a range of about 6 to about 7 parts by weight, based on 100 parts by weight of the PSA. A bonding force between the polymers in the adhesive layer may be greatly improved when the amount of the curing agent is about 6 parts by weight or greater, and weakening of adhesion between the adhesive layer and the adherend may be effectively prevented when the amount is about 7 parts by weight or less.

The first adhesive layer 210 may be formed to be a color that substantially blocks transmission of light such as black, gray, or white to block light leakage, or may further include a light absorbent such as carbon black ("P") or a pigment.

In an exemplary embodiment, an amount of carbon black P contained in the first adhesive layer 210 may be in a range of about 0.1 to about 0.18 parts by weight, based on 100 parts by weight of the PSA. Accordingly, an optical density OD calculated by Equation 1 may be about 5 or greater.

$$A = \log_{10}\left(\frac{P_0}{P'}\right)$$ Equation 1

In Equation 1, A denotes the optical density OD, $P_0$ denotes light intensity before the light is transmitted through an object, and P' denotes intensity of the light transmitted through the object.

A light absorbing ability of the first adhesive layer 210 may be improved to effectively block light leakage when the amount of carbon black is about 0.1 parts by weight or greater, and weakening of the adhesive force of the double-sided tape 200 may be prevented by securing a sufficient content of the components associated with the adhesive force when the amount of carbon black is about 0.18 parts by weight or less.

The first adhesive layer 210 may have a degree of cross-linking of about 40% to about 49% by weight between PSA components such as the acrylic copolymer.

The second adhesive layer 220 may have the same material, composition, and physical properties as the above-described first adhesive layer 210.

The foamed polymer layer 230 is disposed on the first adhesive layer 210. The foamed polymer layer 230 is a layer containing a foamable polymer such as polyurethane, and may act to give a sufficient impact resistance to the double-sided tape 200 and prevent light leakage.

The foamed polymer layer 230 may include a urethane foam such as a polyurethane foam, a polystyrene foam, or a combination thereof.

A density of the foamed polymer layer 230 may be in a range of about 0.36 g/cm$^3$ to about 0.6 g/cm$^3$. The density of the foamed polymer layer 230 is related to tensile strength of the double-sided tape 200, and the double-sided tape may exhibit optimal physical properties in the above-mentioned density range. The tensile strength of the double-sided tape 200 may be greatly improved when the density is about 0.36 g/cm$^3$ or greater, and an adverse effect may be prevented from being exerted when realizing a curvature of a curved display device when the density is about 0.6 g/cm$^3$ or less.

In an embodiment, the double-sided tape may have a vertical ultimate tensile strength of about 15.47 kilogram-force per square inch (kgf/inch$^2$) or greater measured 24 hours after the double-sided tape is attached to the mold frame and the display panel, for example, about 15.47 kgf/inch$^2$ to about 16.33 kgf/inch$^2$ measured 24 hours after the double-sided tape is attached to the mold frame and the display panel.

In an embodiment, the double-sided tape may have a horizontal ultimate tensile strength of about 12.8 kgf/inch$^2$ or greater measured 30 minutes after the double-sided tape is attached to the mold frame and the display panel, for example, about 12.8 kgf/inch$^2$ to about 13.5 kgf/inch$^2$ measured 30 minutes after the double-sided tape is attached to the mold frame and the display panel.

The foamed polymer layer 230 may be formed to be a color such as black, gray, white, or the like, or may further include a light absorbent such as carbon black, a pigment, or the like so that the optical density OD calculated by Equation 1 is about 5 or greater.

The interlayer polymer layer 240 is disposed on the foamed polymer layer 230. The interlayer polymer layer 240 may be applied to easily remove a residue of the double-sided tape 200 remaining on the surface of the display panel 100 when the double-sided tape 200 is removed to reuse the display panel 100.

The interlayer polymer layer 240 may include a thermoplastic resin such as a polyolefin ("PO"), polyethylene terephthalate ("PET"), and a polyester, or a combination thereof. Examples of PO may include polyethylene ("PE"), polypropylene ("PP'), and the like.

The interlayer polymer layer 240 may be formed to be a color such as black, gray, white, or the like, or may further include a light absorber such as carbon black or a pigment so that the optical density OD calculated by Equation 1 is about 5 or greater.

In the double-sided tape 200 according to an embodiment, the foamed polymer layer 230 may have a thickness of about 0.3 mm to about 1.15 mm, the interlayer polymer layer 240 may have a thickness of about 0.045 mm to about 0.055 mm, each of the first and second adhesive layers 210 and 220 may have a thickness of about 0.05 mm to about 0.1 mm, and a total thickness of the double-sided tape 200 may be in a range of about 0.4 mm to about 1.3 mm.

When the total thickness of the double-sided tape 200 is less than about 0.4 mm, the double-sided tape 200 may have difficulty withstanding, e.g., the not tearing, a 65° C. and 90% humidity environment for 500 hours or more when applied to the curved display device 1 having a curvature of about 1,000 R. However, when the thickness is about 1.3 mm or greater, the double-sided tape may withstand, e.g., not tear under, the same conditions for 500 hours or more.

However, embodiments are not limited thereto, and the thickness of each layer included in the double-sided tape 200 may be appropriately changed as necessary.

As described above, the double-sided tape 200 is formed by combining components such as the coupling agent, the curing agent, carbon black, and the dense foamed polymer layer 230 described above and the adhesive force and the tensile strength relative to the adherend may be remarkably improved in comparison to the conventional double-sided tape, a light leakage phenomenon may be effectively blocked, and the double-sided tape may be adhered and fixed to the adherend while withstanding, e.g., not tearing when subjected to, stresses generated between the display panel 100 and the mold frame 300 even when applied to a curved display device having a curvature of about 600 R to about 4,000 R.

More details regarding embodiments will be described with reference to the following specific preparation examples and experimental examples, and content not described herein may be sufficiently technically inferred by those skilled in the art, and thus descriptions thereof will be omitted.

EXAMPLES

Preparation of Double-Sided Tape

Preparation Example 1

A plurality of double-sided tapes, in which a first adhesive layer, a white foamed polymer layer including a polyurethane foam, an interlayer polymer layer including PET, and a second adhesive layer are sequentially stacked, were prepared to be used in experiments which will be described later.

The first adhesive layer and the second adhesive layer were formed to include an acrylic copolymer, a silane coupling agent (1 part by weight, based on 100 parts by weight of the acrylic copolymer), toluene-2,4-diisocyanate (6 parts by weight, based on 100 parts by weight of the acrylic copolymer) and carbon black (0.15 parts by weight, based on 100 parts by weight of the acrylic copolymer).

Preparation Example 2

A plurality of the double-sided tapes were prepared in the same manner as in Preparation Example 1 except that the foamed polymer layer was formed to be black.
Experiment on Characteristics of Double-Sided Tape Experimental Example 1

In order to examine tensile properties of the double-sided tape of Preparation Example 1, a vertical tensile experiment was performed on the double-sided tape as follows.

Three double-sided tapes of Preparation Example 1 cut to have an area of 1 inch×1 inch were prepared. The double-sided tapes were attached to the first adhesive layer and the second adhesive layer so that the first adhesive layer and the second adhesive layer were in contact with a PC plate and a glass plate, respectively, and were aged for 24 hours (hr). A mount was fixed to opposing surfaces of the PC plate and glass plate to which the double-sided tapes were adhered with a strong glue, and the mount was pulled in a vertical direction at a speed of 10 millimeters per minute (mm/min) using an Instron testing machine to measure tensile strength thereof.

As a comparative example, the same experiment as described above was performed using a foam tape made by 3M (Comparative Example 1).

As a result of the experiment, the foam tape of Comparative Example 1 was torn after being pulled for a certain period of time, whereas the maximum adhesive force of the double-sided tape of Preparation Example 1 could not be measured because the glue to which the mount was fixed fell off, e.g., became unadhered, before the double-sided tape tore. Table 1 summarizes the measured tensile strength (ultimate tensile strength) of the double-sided tape of Preparation Example 1 just before the glue by which the mount was fixed fell off, e.g., became unadhered, and the measured tensile strength (ultimate tensile strength) just before the foam tape of Comparative Example 1 was torn.

TABLE 1

| Tape No. | Ultimate Tensile Strength (kilogram-force per square inch (kgf/inch$^2$)) | |
|---|---|---|
| | Preparation Example 1 | Comparative Example 1 |
| 1 | 16.29~ | 4.84 |
| 2 | 16.33~ | 4.87 |
| 3 | 15.47~ | 4.96 |
| Average | 16.12~ | 4.89 |

Experimental Example 2

In order to examine tensile properties of the double-sided tapes of Preparation Examples 1 and 2, a horizontal tensile experiment was performed on the double-sided tapes as follows.

Three double-sided tapes cut to have an area of 50 millimeters (mm)×25 mm were prepared for each of Preparation Examples 1 and 2. A PC plate was attached to a side of a first adhesive layer of each of the double-sided tapes so that an attachment area thereof was 25 mm×25 mm, and aged at room temperature for 30 minutes (min) after performing reciprocal pressing with a 2 kilogram (kg) weight two times. A portion of the double-sided tape to which the PC plate was not attached was then fixed such that the double-sided tape and the PC plate were perpendicular to the ground, and then a 1 kg weight was connected to the PC plate to transfer a horizontal tensile force to the double-sided tape. An experimental environment was maintained at 85° C. and 85% humidity.

As comparative examples, the same experiment as described above was performed using three pieces of each of two kinds of foam tapes made by 3M (Comparative Examples 2 and 3).

As a result of the experiment, the foam tapes of Comparative Examples 2 and 3 were torn after a certain period of time, whereas the double-sided tapes of Preparation Examples 1 and 2 held their adhesive forces for at least 4 hours. Table 2 summarizes a measured value of a holding time of each of the tapes and an average holding time of each of the examples and comparative examples.

TABLE 2

| | Tape No. | Holding Time (min) | Average Holding Time (min) | Note |
|---|---|---|---|---|
| Comparative Example 2 | 1 | 46 | 43 | Foam tape torn |
| | 2 | 54 | | |
| | 3 | 31 | | |
| Comparative Example 3 | 1 | 10 | 5 | Foam tape torn |
| | 2 | 3 | | |
| | 3 | 4 | | |
| Preparation Example 1 | 1 | 240~ | 240~ | Experiment finished after 4-hour check |
| | 2 | 240~ | | |
| | 3 | 240~ | | |
| Preparation Example 2 | 1 | 240~ | 240~ | |
| | 2 | 240~ | | |
| | 3 | 240~ | | |

Experimental Example 3

In order to examine the tensile properties of the double-sided tapes of Preparation Examples 1 and 2, a horizontal tensile experiment was performed on the double-sided tapes in a different manner as follows.

Two double-sided tapes cut to have an area of 25 mm×25 mm were prepared for each of Preparation Examples 1 and 2. Each of the double-sided tapes was attached to a first adhesive layer and a second adhesive layer so that the first adhesive layer and the second adhesive layer were in contact with a PC plate and a glass plate, respectively, and was aged at room temperature for 30 minutes after performing reciprocal pressing with a 2 kg weight two times. The PC plate was then fixed, and the glass plate was pulled in a horizontal direction at a speed of 1 mm/min using an Instron testing machine to measure tensile strength and a tensile distance thereof.

As a comparative example, the same experiment as described above was performed using two foam tapes made by 3M (Comparative Example 4).

As a result of the experiment, ultimate tensile strength, which is tensile strength just before a tape is torn, and the tensile distance of Preparation Examples 1 and 2 were significantly better than those of the double-sided tapes of Comparative Example 4. Table 3 summarizes measured tensile strength (ultimate tensile strength) and tensile distance just before each of the tapes was torn and averages of the ultimate tensile strength and the measured tensile distances for each of the preparation examples and comparative examples.

TABLE 3

| | Tape No. | Ultimate Tensile Strength (kgf/inch²) | Tensile Distance (mm) | Average Ultimate Tensile Strength (kgf/inch²) | Average Tensile Distance (mm) |
|---|---|---|---|---|---|
| Preparation Example 1 | 1 | 13.5 | 4.1 | 13.2 | 3.9 |
| | 2 | 12.8 | 3.7 | | |
| Preparation Example 2 | 1 | 13.0 | 3.7 | 13.0 | 3.7 |
| | 2 | 13.0 | 3.6 | | |
| Comparative Example 4 | 1 | 10.3 | 2.7 | 10.5 | 2.7 |
| | 2 | 10.7 | 2.7 | | |

Experimental Example 4

In order to examine adhesive force holding performance when the double-sided tape of Preparation Example 1 was applied to a curved display device, and an acceleration experiment was performed on the double-sided tape as follows.

Ten display device models were prepared by attaching a 34-inch (34") 0.4 mm thick (0.4 t) glass plate having a curvature of 1,000 R to a mold frame fixed to a backlight unit with the double-sided tape of Preparation Example 1 attached at positions of 4 mm from a light-facing portion, 4.5 mm from a light-incident portion, and 2.5 mm from a right/left edge. In addition, five additional display device models were prepared in the same manner except that the glass plate had a curvature of 1,200 R. Thereafter, a state of the samples was observed over time under conditions of 65° C. and 90% humidity.

As comparative examples, each of a tape made by NITTO, a tape made by TAPEX, and a tape made by 3M was used to prepare 1,000 R and 1,200 R models in the same manner as described above, and the same experiment as described above was performed thereon.

As a result of the experiment, most of the 1,000 R and 1,200 R models using the double-sided tape of Preparation Example 1 held their adhesive force and durability even after 1,000 hours, as shown in Table 4, whereas the 1,000 R models using the double-sided tapes of the comparative examples were damaged after 216 hours, as shown in Table 5.

TABLE 4

| Elapsed Time (hr) | 1,000 R Model (10EA) | 1,200 R Model (5EA) |
|---|---|---|
| 120 | No change in all 10 models | No change in all 5 models |
| 192 | No change in all 10 models | No change in all 5 models |
| 288 | 3 models damaged, and no change in remaining 7 models | 2 models damaged, and change in remaining 3 models |
| 336 | No change in 7 models | No change in 3 models |
| 500 | No change in 7 models | No change in 3 models |
| 774 | No change in 7 models | No change in 3 models |
| 1,000 | 1 model damaged, and no change in remaining 6 models | No change in 3 models |
| 1,312 | 1 model damaged, and no change in remaining 5 models | No change in 3 models |

TABLE 5

| Elapsed Time (hr) | NITTO Model (1EA) | | TAPEX Model (1EA) | | 3M Model (1EA) | |
|---|---|---|---|---|---|---|
| | 1,000 R | 1,200 R | 1,000 R | 1,200 R | 1,000 R | 1,200 R |
| 24 | No change | No change | Glass damaged | No change | Tape torn | No change |
| 72 | No change | No change | — | No change | — | No change |
| 168 | No change | No change | — | No change | — | No change |
| 216 | Inflection point damaged | No change | — | No change | — | No change |
| 336 | — | No change | — | No change | — | Inflection point damaged |
| Note | Tape torn at inflection point of glass plate after 216 hours in 1,000 R model | | 1,200 R model damaged after 500 hours | | Tape torn at inflection point of glass plate after 336 hours in 1,200 R model | |

Experimental Example 5

In order to evaluate adhesive properties depending on whether a silane coupling agent was used in the double-sided tape, a vertical tensile experiment was performed on the double-sided tape as follows.

Six double-sided tapes of Preparation Example 1 were prepared, each of the double-sided tapes was attached to a glass plate with a width of 25 mm so that the glass plate faces a second adhesive layer thereof, and three of the double-sided tapes were aged at room temperature for 20 minutes while the remaining three were aged at 60° C. for 24 hours.

Thereafter, tensile strength was measured while pulling the glass plate at a speed of 300 mm/min in the horizontal direction while the double-sided tapes were fixed thereto.

For Comparative Example 5, the same experiment as described above was performed using six double-sided tapes prepared in the same manner as in Preparation Example 1, except that no silane coupling agent was added thereto.

As a result of the experiment, tensile strength (in Newtons per 25 millimeters (N/25 mm)) just before the double-sided tape was torn is summarized in Table 6, and the double-sided tape of Preparation Example 1 to which the silane coupling agent was added under an aging condition of 60° C. for 24 hours showed a significantly better adhesive property than the double-sided tape with no silane coupling agent of Comparative Example 5.

TABLE 6

| | Tape No. | Tensile Strength (N/25 mm) | |
|---|---|---|---|
| | | Preparation Example 1 | Comparative Example 5 |
| Aging for 20 Minutes | 1 | 18.45 | 18.57 |
| | 2 | 18.55 | 19.58 |
| | 3 | 19.88 | 19.83 |
| | Average | 18.96 | 19.33 |
| Aging for 24 Hours at 60° C. | 1 | 38.23 | 22.79 |
| | 2 | 37.29 | 27.56 |
| | 3 | 36.23 | 22.08 |
| | Average | 37.25 | 24.14 |
| Rate of Change in Adhesive Force Over Time (%) | | 196 | 125 |

According to embodiments, by applying components such as a coupling agent, a curing agent, carbon black, and a dense foamed polymer layer to a double-sided tape, an adhesive force and tensile strength of the double-sided tape relative to an adherend may be remarkably improved, a light leakage phenomenon may be effectively blocked, and the double-sided tape may be attached and fixed between a display panel and a mold frame while withstanding, e.g., not tearing when subjected to, stresses generated between the display panel and the mold frame even when applied to a curved display device.

The effects according to embodiments are not limited to those exemplified above, and a larger variety of effects are included in the specification.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A double-sided tape in combination with a curved display panel having a curvature in at least one direction and a curved mold frame having a shape corresponding to the display panel, the display panel having a curvature in a range of about 600 R to about 4,000 R, wherein the double-sided tape is configured to fix the display panel to the mold frame, the double-sided tape comprising:
   a first adhesive layer comprising about 100 parts by weight of an acrylic polymer, about 1 to about 2 parts by weight of a silane coupling agent, and about 0.1 to about 0.18 parts by weight of carbon black, the first adhesive layer having a degree of crosslinking of about 40% to about 49% by weight and an optical density of about 5 or greater;
   a foamed polymer layer directly disposed on and in contact with the first adhesive layer, the foamed polymer layer comprising a urethane foam, the foamed polymer layer having an optical density of about 5 or greater and a thickness of about 0.3 millimeters to about 1.15 millimeters;
   an interlayer polymer layer directly disposed on and in contact with the foamed polymer layer, the interlayer polymer layer comprising a polyolefin, a polyethylene terephthalate, a polyester, or a combination thereof, the foamed polymer layer having an optical density of about 5 or greater and a thickness of about 0.045 millimeters to about 0.055 millimeters; and
   a second adhesive layer directly disposed on and in contact with the interlayer polymer layer, the second adhesive layer comprising about 100 parts by weight of an acrylic polymer, about 1 to about 2 parts by weight of a silane coupling agent, and about 0.1 to about 0.18 parts by weight of carbon black, the second adhesive layer having a degree of crosslinking of about 40% to about 49% by weight and an optical density of about 5 or greater,
   wherein an overall thickness of the double-sided tape is in a range of about 0.4 millimeters to about 1.3 millimeters.

2. The double-sided tape of claim 1, wherein the silane coupling agent comprises a compound represented by Formula 1:

$$Y'-Si-(OR)_3 \quad \text{Formula 1}$$

wherein, in Formula 1, Y' represents an amino group, an epoxy alkyl group, a mercapto group, or an allyl group, and each OR independently represents an alkoxy group or an acetyloxy group.

3. The double-sided tape of claim 1, wherein the first adhesive layer, the second adhesive layer, or a combination thereof further comprises an isocyanate curing agent.

4. The double-sided tape of claim 3, wherein the isocyanate curing agent comprises toluene-2,4-diisocyanate or a derivative thereof.

5. The double-sided tape of claim 3, wherein the first adhesive layer, the second adhesive layer, or the combination thereof comprise about 6 to about 7 parts by weight of the isocyanate curing agent, based on the 100 parts by weight of the acrylic polymer.

6. The double-sided tape of claim 1, wherein the foamed polymer layer has a density of about 0.36 grams per cubic centimeter to about 0.6 grams per cubic centimeter.

7. The double-sided tape of claim 1, wherein the double-sided tape has a vertical ultimate tensile strength of about 15.47 kilogram-force per square inch or greater, when measured 24 hours after the double-sided tape is attached to a mold frame and a display panel.

8. The double-sided tape of claim 1, wherein the double-sided tape has a horizontal ultimate tensile strength of about 12.8 kilogram-force per square inch or greater, when measured 30 minutes after the double-sided tape is attached to a mold frame and a display panel.

9. A double-sided tape in combination with a curved display panel having a curvature in at least one direction and a curved mold frame having a shape corresponding to the display panel, the display panel having a curvature in a range of about 600 R to about 4,000 R, wherein the double-sided tape is configured to fix the display panel to the mold frame, the double-sided tape comprising:
   a first adhesive layer comprising about 100 parts by weight of an acrylic polymer, about 1 to about 2 parts by weight of a silane coupling agent, and about 0.1 to about 0.18 parts by weight of carbon black;
   a foamed polymer layer directly disposed on and in contact with the first adhesive layer, the foamed polymer layer comprising a urethane foam, the foamed polymer layer having a thickness of about 0.3 millimeters to about 1.15 millimeters;
   an interlayer polymer layer directly disposed on and in contact with the foamed polymer layer, the interlayer polymer layer comprising a polyolefin, a polyethylene terephthalate, a polyester, or a combination thereof, the interlayer polymer layer with a thickness of about 0.045 millimeters to about 0.055 millimeters; and
   a second adhesive layer directly disposed on and in contact with the interlayer polymer layer, the second adhesive layer comprising about 100 parts by weight of an acrylic polymer, about 1 to about 2 parts by weight of a silane coupling agent, and about 0.1 to about 0.18 parts by weight of carbon black,
   wherein an overall thickness of the double-sided tape is in a range of about 0.4 millimeters to about 1.3 millimeters.

10. The double-sided tape of claim 9, wherein the first adhesive has a degree of crosslinking of about 40% to about 49% by weight.

11. The double-sided tape of claim 9, wherein the second adhesive layer has a degree of crosslinking of about 40% to about 49% by weight.

12. The double-sided tape of claim 9, wherein the first adhesive layer, and the foamed polymer layer, have an optical density of about 5 or greater.

13. The double-sided tape of claim 12, wherein the interlayer polymer layer, and the second adhesive layer, have an optical density of about 5 or greater.

14. The double-sided tape of claim 9, wherein the foamed polymer layer has a density in a range of about 0.36 g/cm$^3$ to about 0.6 g/cm$^3$.

* * * * *